(12) United States Patent
Zhang

(10) Patent No.: US 8,834,958 B2
(45) Date of Patent: Sep. 16, 2014

(54) PROCESS OF MAKING NEGATIVE ELECTRODE

(75) Inventor: Shengshui Zhang, Olney, MD (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 445 days.

(21) Appl. No.: 13/178,561

(22) Filed: Jul. 8, 2011

(65) Prior Publication Data

US 2013/0011737 A1 Jan. 10, 2013

(51) Int. Cl.

| | |
|---|---|
| *B05D 5/12* | (2006.01) |
| *C23C 18/54* | (2006.01) |
| *C23C 18/16* | (2006.01) |
| *H01M 4/04* | (2006.01) |
| *C23C 18/00* | (2006.01) |
| *H01M 4/1395* | (2010.01) |
| *H01M 4/134* | (2010.01) |
| *C23C 18/52* | (2006.01) |
| *H01M 4/38* | (2006.01) |
| *H01M 4/66* | (2006.01) |

(52) U.S. Cl.
CPC ............ *H01M 4/0452* (2013.01); *H01M 4/661* (2013.01); *C23C 18/00* (2013.01); *Y02E 60/122* (2013.01); *H01M 4/1395* (2013.01); *H01M 4/134* (2013.01); *C23C 18/52* (2013.01); *H01M 4/387* (2013.01)
USPC .... 427/99.5; 427/115; 427/383.1; 427/434.4; 427/437; 427/443.1

(58) Field of Classification Search
USPC .......... 427/99.5, 115, 123, 383.1, 434.4, 437, 427/443.1
See application file for complete search history.

(56) References Cited

U.S. PATENT DOCUMENTS

| | | | |
|---|---|---|---|
| 3,769,182 A | 10/1973 | Beckwith et al. | |
| 4,027,055 A | 5/1977 | Sneble, Jr. | |
| 4,093,466 A | 6/1978 | Davis | |
| 4,118,289 A | 10/1978 | Hsu | |
| 4,194,913 A | 3/1980 | Davis | |
| 4,565,609 A | 1/1986 | Nobel et al. | |
| 4,565,610 A | 1/1986 | Nobel et al. | |
| 4,599,149 A | 7/1986 | Nobel et al. | |
| 4,617,097 A | 10/1986 | Nobel et al. | |
| 4,701,244 A | 10/1987 | Nobel et al. | |
| 4,849,059 A | 7/1989 | Deresh et al. | |

(Continued)

OTHER PUBLICATIONS

Martin Winter et al., "Electric lithiation of tin and tin-based intermetallics and composites," Electrochimica Acta 45, p. 31-50 (1999).

(Continued)

*Primary Examiner* — Brian K Talbot
(74) *Attorney, Agent, or Firm* — John H. Raubitschek; Robert Thompson

(57) ABSTRACT

A process of electroless plating a tin or tin-alloy active material onto a metal substrate for the negative electrode of a rechargeable lithium battery comprising steps of (1) immersing the metal substrate in an aqueous plating solution containing metal ions to be plated, (2) plating tin or tin-alloy active material onto the metal substrate by contacting the metal substrate with a reducing metal by swiping one on the other, and (3) removing the plated metal substrate from the plating bath and rinsing with deionized water. A rechargeable lithium battery using tin or tin-alloy as the anode active material.

12 Claims, 3 Drawing Sheets

(56) References Cited

U.S. PATENT DOCUMENTS

| | | |
|---|---|---|
| 5,174,887 A | 12/1992 | Federman et al. |
| 5,248,527 A | 9/1993 | Uchida et al. |
| 5,266,103 A | 11/1993 | Uchida et al. |
| 5,282,954 A | 2/1994 | Opaskar |
| 6,610,357 B2 | 8/2003 | Endo et al. |
| 6,916,581 B2 | 7/2005 | Tamura et al. |
| 7,160,629 B2 | 1/2007 | Crosby |
| 7,297,446 B2 | 11/2007 | Fukui et al. |

OTHER PUBLICATIONS

C.J. Wen et al., "Thermodynamic Study of the Lithium-Tin System," 128, p. 1181-1187 (1981).

H.C. Shin et al., "Nanoporous Structures Prepared by an Electrochemical Deposition Process," Adv. Mater. 15, p. 1610-1614 (2003).

PROCESS OF MAKING NEGATIVE ELECTRODE

GOVERNMENT INTEREST

The embodiments described herein may be manufactured, used, sold, imported and/or licensed by or for the United States Government without the payment of royalties thereon.

BACKGROUND

1. Technical Field

This invention relates to a process of plating tin or tin-alloy on a metal substrate. In particular, the present invention relates to a negative electrode comprising tin or tin-alloy active material and a rechargeable lithium battery using the same.

2. Description of Related Prior Art

Rechargeable lithium-ion batteries are the main power sources for many portable electronic devices with high demand for high energy density and weight saving. Currently, these batteries are based on a carbonaceous anode material, which has a limited theoretical capacity of 372 mAh/g. Lightweight lithium metal is known to provide much higher energy density, however, use of it as the anode is unsafe due to the unavoidable formation of lithium dendrites during charging, which results in electric short-circuit of the battery. Furthermore, high reactivity of metal lithium to the electrolytic solvents results in fast degradation of cell chemistry, which hence limits cycle life of the batteries. To alleviate these problems of metal lithium, Li alloys have been proposed as an alternative anode material of rechargeable lithium batteries. Among numerous Li-alloys for the anode material of rechargeable lithium batteries, Li—Sn alloy has shown most promising as described in J. Electrochem. Soc. 128 (1981) 1181 and reviewed in Electrochim. Acta 45 (1999) 31. The Li—Sn alloy is generally fabricated in a form of sheet and it is directly used as both the anode active material and current collector. Owing to huge volume changes accompanied during alloying and dealloying, the alloy quickly pulverizes and loses electric contact between the alloy particles. As a result, the performance of the Li alloy fades very fast with cycling. An easy solution to retaining good electrical contact of the alloy particles is to coat tin or tin-alloy on a metal substrate as the current collector at a small expense of energy density due to the incorporation of electrochemically inert agents such as binder and conducting additive. Therefore, a technique without need of binder and conducting additive based on plating of alloy active material on the current collector is highly recommended for maximized energy density of an alloy anode.

Electroplating and electroless plating are two widely used methods for plating tin or tin-alloy on a metal substrate. The electroplating typically uses an aqueous acidic bath containing metal ions to be plated with an external current applied on two ends of the metal substrate to be plated and a counter electrode. The desirable acidity of the solution is achieved by adding appropriate amount of either inorganic acid as disclosed in U.S. Pat. Nos. 3,769,182 and 4,118,289 or organic acid as disclosed in U.S. Pat. Nos. 4,565,610, and 4,617,097. To facilitate the plating process, various complexing agents and surfactants ranging from small organic molecules to large polymeric molecules are used as the auxiliary additives as disclosed in U.S. Pat. Nos. 4,565,609, 4,599,149, 4,701,244, 4,849,059, 5,174,887, 5,282,954 and 7,160,629. Disadvantages of the electroplating process are: it is not suitable for plating of large size substrates and it is difficult to make a uniform plating layer due to uneven distribution of current density, especially when the current and thickness are high. On the other hand, metal tin or tin-alloy as an anode material of rechargeable battery is required to be highly porous so as to buffer the huge volume change accompanied with cycling for the durable cycle life. It has been reported (Adv. Mater. 12 (2003) 1610-1614) that such structures can be obtained by adjusting electroplating conditions such as current density and acidity.

Electroless plating, or immersion plating, involves the use of a plating bath without the imposition of external electric current where the substrate is plated by reduction of the metal ions from a solution of the plating metal salt. Electroless plating is characterized by a catalytic nature of the substrate surface which enables the metal to be plated to any thickness. Typically, the plating solution comprises a solvent, a salt of the plating metal, a reducing agent capable of reducing the metal ions to be plated, a complexing agent for the metal ions to be plated, a surfactant as the wetting agent, and an appropriate amount of acid as a pH regulator of the solution. In the plating process, the reduction is catalyzed by the surface of the substrate to deposit the reduced metal onto the substrate. Since the reduction is autocatalytic without need of an external current, the electroless plating is suitable for making a plating layer with any thicknesses and excellent uniformity. A number of inorganic and organic compounds have been used as the reducing agent for the electroless plating of tin and tin-alloy. These compounds include alkali metal polysulfides as disclosed in U.S. Pat. No. 4,027,055, hypophosphorus acid and water soluble hypophosphites as disclosed in U.S. Pat. Nos. 4,093,466, 4,194,913, 5,248,527, 5,266,103, as well as guanamine compounds as disclosed in U.S. Pat. No. 4,555,314.

U.S. Pat. Nos. 4,550,037 and 4,618,513 taught a method for coating a tin layer on an electro-conductive substrate by an immersion process. In this method, metallic zinc was used as the reducing agent, and many strips of zinc were directly contacted with the substrate to be coated or indirectly connected the substrate to be coated using copper wires while both were immersed in the bath containing a stannous salt and a special surfactant. This process is capable of coating a pore-free, smooth and highly adherent tin layer on the electro-conductive substrate. However, this process is not suitable for plating of tin on a substrate with large area, and the thickness of tin coating is highly dependent on the positions of contacting points or connecting points between the zinc and substrate. In addition, pore-free structure is not favorable for long cycle life of rechargeable lithium battery when tin is used as the negative electrode.

SUMMARY OF THE INVENTION

Accordingly, an object of this invention is to provide a method for plating of tin or tin-alloy on a metal substrate with large area. More specifically, an object of the present invention is to provide for fast plating of tin or tin-alloy on a current collector of the negative electrode of a rechargeable lithium battery. A further object is to provide a method for making the negative electrode which has a high capacity and also an excellent cycle characteristic thereof, and a battery using the same.

To achieve the foregoing objects, metallic tin or tin-alloy is plated through an electroless process on a metal substrate wherein the tin or tin-alloy plating functions as the anode active material of a rechargeable lithium battery and the metal substrate serves as the current collector of the negative electrode. The electroless plating comprises steps of (a) immersing both reducing metal and metal substrate in an aqueous plating bath containing tin or alloy metal ions, (b) contacting the reducing metal and the substrate by swiping one on the other, and (c) rinsing the plated substrate and drying. The features and advantages of the present invention will be evident from the following detailed description of the preferred embodiments described in conjunction with the attached drawings.

BRIEF DESCRIPTION OF THE DRAWINGS

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DESCRIPTION OF THE PREFERRED EMBODIMENTS

The present invention will be further described with reference to negative electrode used in rechargeable lithium battery as an embodiment.

In the state-of-the-art lithium-ion batteries, copper foil is used as the current collector of the negative electrode. Therefore, in the present invention copper foil is a preferable substrate for plating of tin or tin-alloy. Since tin has a more negative standard electrode potential than copper, tin cannot be plated from its salt solution onto the surface of copper substrate using a regular metal displacement without use of external reducing agent and complexing agent. However, this process becomes possible when a metal having more negative standard electrode potential than tin is used as a reducing agent and especially when the over-potential of tin deposition on the reducing metal is high. Based on the principle of a primary cell, tin or alloy is preferably deposited on the surface of copper substrate when the reducing metal and copper substrate make a direct contact. Meanwhile, hydrogen bubbles can be generated on the surface of copper substrate if the pH of the solution is sufficiently low. In this case, tin or tin-alloy layer with high porosity is deposited on the substrate due to the evolution of hydrogen bubbles, which blocks dense deposition of tin or tin-alloy.

Figure 1:
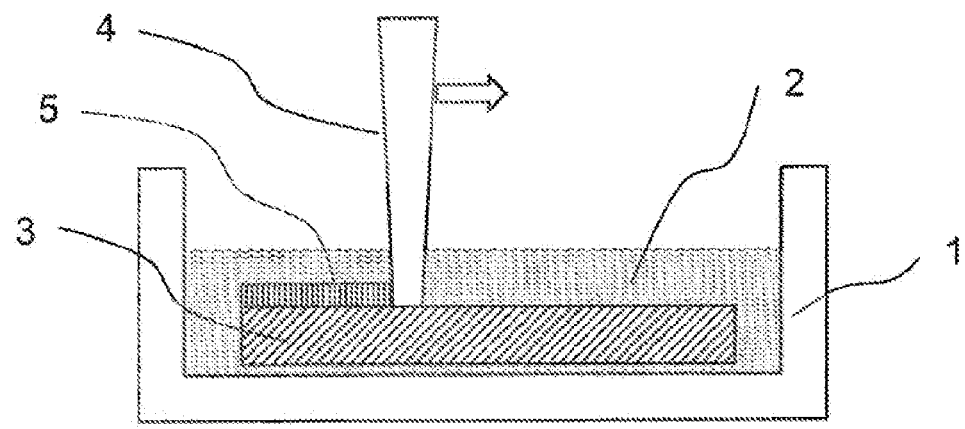
FIG. 1 is a schematic of an electroless plating process of tin or tin-alloy on a metal substrate of the present invention.

The plating process of the present invention can be briefly described as three steps of (a) immersing a reducing metal and a metal substrate into an aqueous plating bath containing tin or tin-alloy metal ions, (b) contacting the reducing metal and the metal substrate by swiping one on the other, and (c) rinsing the plated substrate and drying it FIG. 1 shows a schematic of a plating process of tin or tin-alloy disclosed in the present invention. First, the metal substrate (3) is immersed in a plating bath (1) that contains a solution (2) comprising the metal ions to be plated and a mineral acid for adjustment of the solution pH. Then, a reducing metal (4) is placed on the metal substrate (3) and a constant pressure is applied to maintain good contact and the reducing metal (4) is slowly swiped on the metal substrate (3), leaving the anode metal plating (5) behind. Finally, the plated substrate is rinsed and dried.

The method of the present invention provides a continuous process for electroless plating of tin or tin-alloy on a metal substrate. The thickness of the plating can be easily controlled by the concentration of plating solution, moving speed of the reducing metal or metal substrate, and temperature of the solution. In addition, the porosity of the tin or tin-alloy plating can be adjusted by changing pH of the solution so as to generate hydrogen bubbles.

The method of the present invention suits for plating of tin or tin-alloy having a general formula of $Sn_{1-x-y}M'_xM''_y$ ($0 \leq x \leq 0.50$ and $0 \leq y \leq 0.20$, with a relation of the sum of x and y not to be more than 0.50). M' and M" are independent metals and selected from the group consisting of germanium (Ge), and lead (Pb), antimony (Sb), bismuth (Bi), titanium (Ti), manganese (Mn), iron (Fe), cobalt (Co), nickel (Ni), copper (Cu), zinc (Zn), silver (Ag).

The metal substrate in the method of the present invention is a foil of these metals used widely as the current collector of a negative electrode of rechargeable lithium battery. Preferably, these metals are copper and nickel, more preferably copper.

The reducing metal in the method of the present invention is these metals having more negative standard electrode potential than tin and component metals of tin-alloy. These metals are magnesium (Mg), aluminum (Al), manganese (Mn), zinc (Zn), chromium (Cr), and iron (Fe), preferably, Al and Zn, and more preferably Zn. The reducing metal may be in any shape, but those favoring large contacting area with the metal substrate are preferable.

The plating bath in the method of the present invention is an aqueous solution comprising a salt of the metal ions to be plated and an acid used for adjustment of the solution pH. For high solubility, salts of the metal ions of sulfate, hydrochloride, and nitrate are preferable. Total concentration of the metal ions is from 0.01 to 0.5 M (mole per liter solution). The acid is an inorganic acid or an organic acid, preferably a mineral acid such as sulfuric acid and hydrochloride acid, more preferably the acid and salt have the same anions. pH of the plating solution is from 0.5-2, which is adjusted by adding appropriate amount of acid. Temperature of the plating solution is from 0° C. to 80° C., preferably from 20° C. to 50° C., and more preferably at ambient temperature.

For improved morphology of the plating, auxiliary additives that are widely used in electroplating process of tin and tin-alloy and are known for these who are familiar with the art can be added into the plating solution. These additives include complexing agents for the metal ions to be plated and surfactants as the wetting agents. The total amount of these additives is not more than 50 g per litter solution.

Having described the invention, the following examples are given to illustrate specific applications of the invention including the best mode now known to perform the invention. These specific examples are not intended to limit the scope of the invention described in this application.

Example 1

An aqueous solution of 0.2 M $SnCl_2$ $2H_2O$ was prepared by dissolving weighted amount of $SnCl_2$ $2H_2O$ into deionized water, which led to a milk-like solution due to hydrolysis of the salt, followed by dropping carefully a 36% of hydrochloride acid into the solution until the solution became clear and pH of the solution reached 1. A sheet of copper foil in 2 inch width and 3 inch length was cut as the metal substrate and a strip of aluminum foil in 1 inch width and 2 inch length was cut as the reducing metal. The copper foil was immersed in the solution prepared above, and then the aluminum strip was carefully and slowly swept (scraped) over the copper foil from one side to the other end, which immediately left a uniform tin coating with excellent adhesion and grey color on the surface of copper foil. High thickness of the tin coating was obtained by repeating the sweeping process. Finally, the resulting tin coating was rinsed with deionized water and dried in air.

Example 2

Comparative

Figure 2:
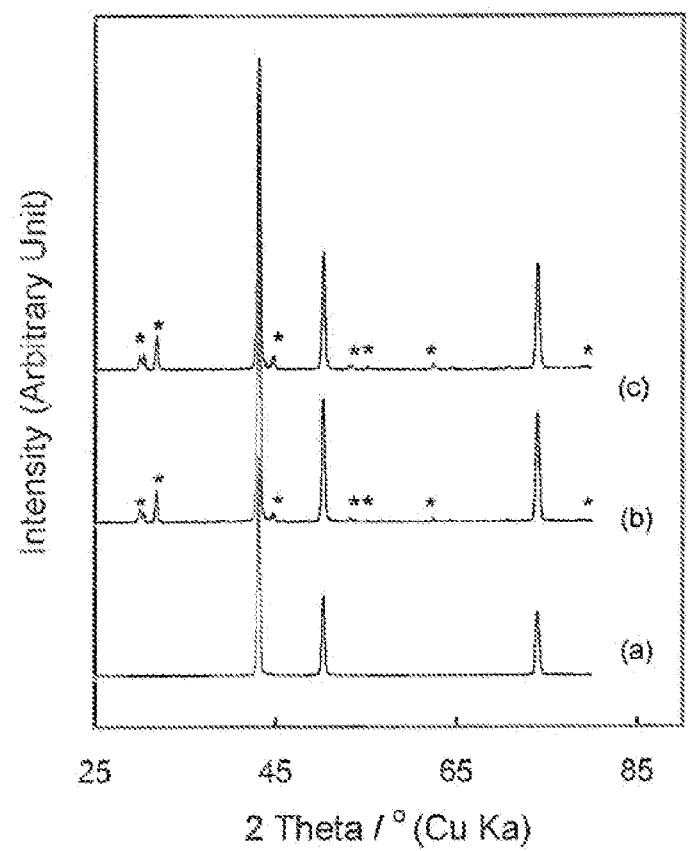
FIG. 2 is a plot showing X-ray diffraction patterns of a copper substrate and tin plating made by electroplating and electroless plating, respectively. (a) copper substrate, (b) tin plating made by electroplating, and (c) tin plating made by electroless plating of the present invention.

The same solution as described in Example 1 was prepared, but an additional 0.03 M of citric acid was added as the complexing agent of stannous ions. A strip of copper foil was immersed into the solution and carefully left an area of 0.5 inch×1.0 inch exposing to the solution. Using the copper foil above as a working electrode, a platinum wire as a counter electrode and a saturated calomel electrode (SCE) as a reference electrode, an electroplating cell was connected to a Solartron S1 1287 Electrochemical Interface. Metal tin was electroplated onto the copper foil by applying a constant potential of 1.5 V vs. SCE for 20 seconds, followed by removing the tin-coated copper foil from the electroplating cell, rinsing the tin plating with deionized water and drying in air. As indicated by the results of x-ray diffraction analyses (FIG. 2), the tin coatings made by the method of the present invention and by the traditional electroplating process, respectively, have the same crystalline structure.

Example 3

Comparative

Figure 3:
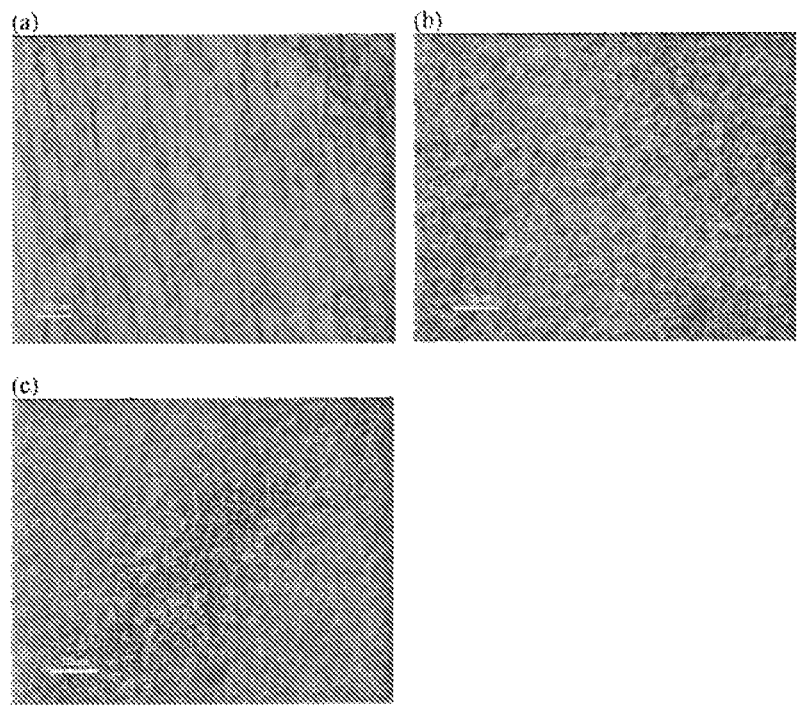
FIG. 3 is a plot showing microscope photos of the surface of (a) copper substrate, (b) tin plating made by using aluminum as the reducing agent, and (c) tin plating made by using zinc as the reducing agent.

The same solution and procedures as described in Example 1, but an exception in the reducing metal, were repeated. In this experiment, the aluminum was replaced with a strip of zinc having the same size. Microscope photos, as shown in FIG. 3, indicate that the surfaces of the tin coatings made by using aluminum as the reducing agent and by using zinc as the reducing agent are very similar, and that both have highly porous structure.

Example 4

Comparative

Figure 4:
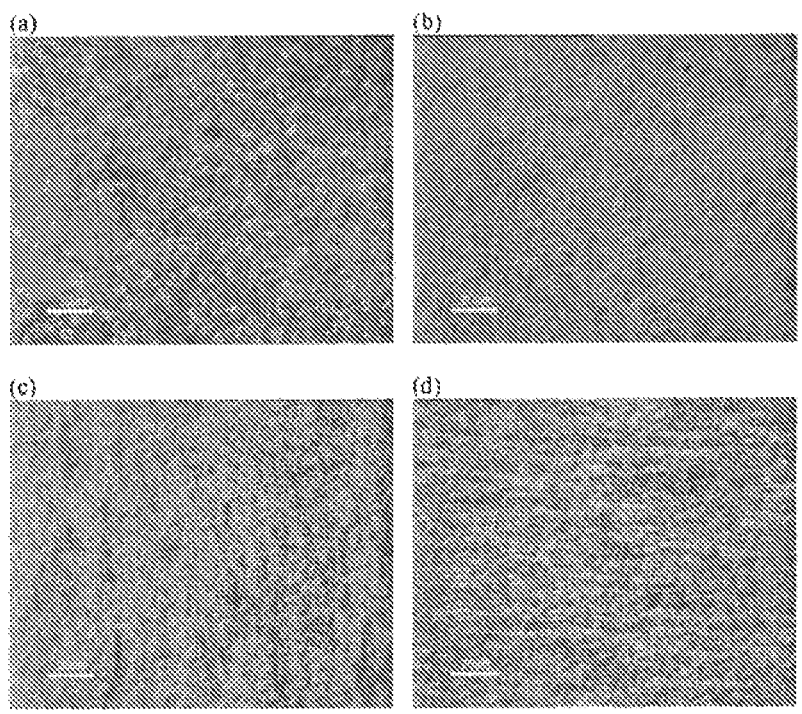
FIG. 4 is a plot showing microscope photos of the surface of (a) tin plating made by electroplating, (b) tin, (c) Sn—Fe alloy, and (d) Sn—Sb alloy, of which (b)-(d) were made by electroless plating of the present invention with aluminum as the reducing agent.

Using the same procedures as described in Example 1, Sn—Fe and Sn—Sb alloys were plated by changing the composition of the plating solution. A solution of 0.15 M $SnCl_2$ $2H_2O$ and 0.05 M $FeSO_4$ $7H_2O$ was used for plating of Sn—Fe alloy, and a solution of 0.15 M $SnCl_2$ $2H_2O$ and 0.05 M $SbCl_3$ was used for plating Sn—Sb alloy. FIG. 4 indicates that all these plating have porous structure and their particle sizes are much smaller than those made by electroplating process.

Example 5

Figure 5:
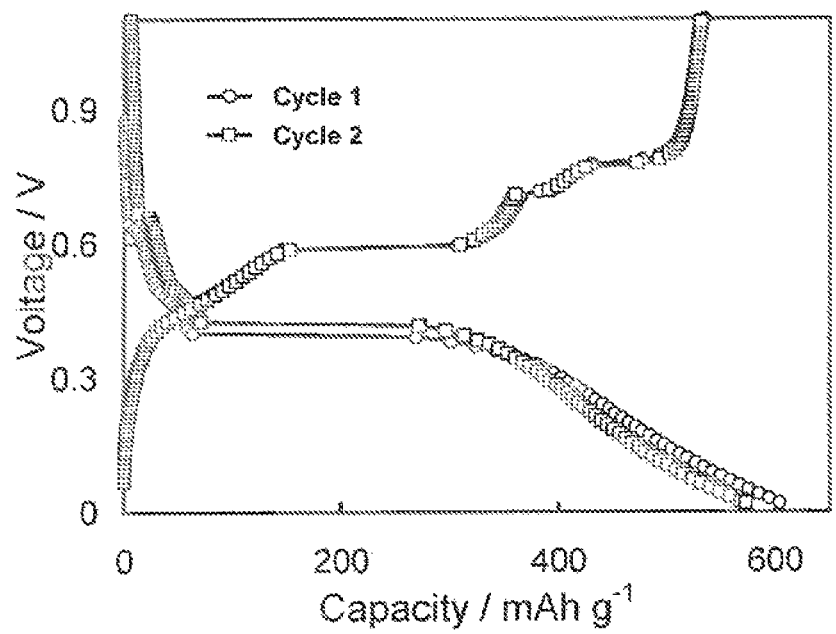
FIG. 5 is a plot showing voltage profiles of discharging and charging processes of a Li/Sn cell using the tin electrode made by the method of the present invention in the first two cycles.
Figure 6:
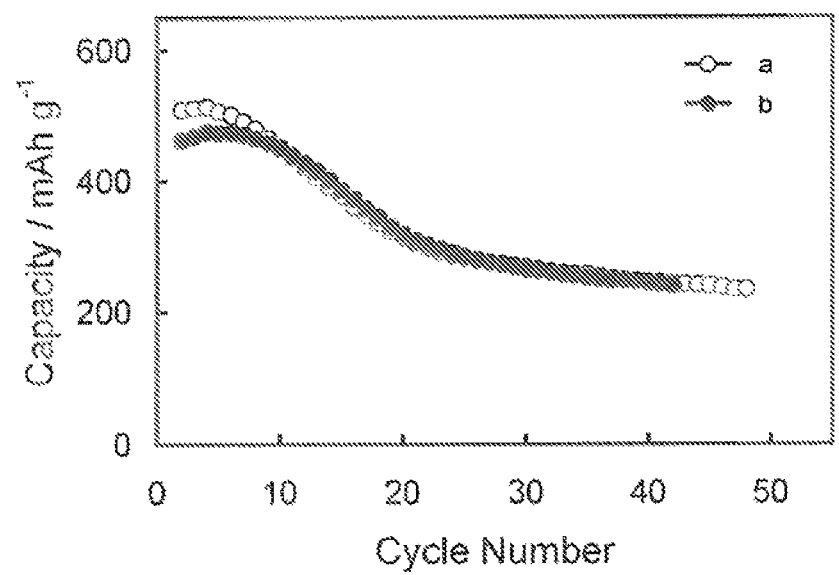
FIG. 6 is a plot showing cycling performance of Li/Sn cells using the tin electrodes made by (a) electroplating and (b) electroless plating, respectively.

The tin-coated copper foil as made in Example 1 was punched into a small circular disk with an area of 1.27 $cm^2$. A Li/Sn coil cell was assembled in an argon-filled glove box by using the tin-coated copper foil as the working electrode, a metallic lithium disk with an area of 1.60 $cm^2$ as the counter electrode, and a solution of 1.0 M $LiPF_6$ dissolved in a 3:7 (wt.) mixture of ethylene carbonate and methyl ethyl carbonate as the electrolyte. The cell was first discharged at about 0.1 C from open-circuit voltage to 0.05 V, followed by cycled at the same current rate between 0.05 V and 1.6 V. The voltage profiles of the first cycles of the cell are shown in FIG. 5, from which the coulombic efficiencies are estimated as 92.8% in the first cycle and 97.1% in the second cycle. On contrary, an identical Li/Sn cell but using the Sn electrode made by the electroplating process as described in example 2 only showed a coulombic efficiency of 82.7% in the first cycle and 96.0% in the second cycle, respectively. Multiply voltage plateaus which are more distinct in charging process suggest multi-stage alloy and dealloy processes of Sn with Li. These behaviors are well consistent with the results of previous literature. FIG. 6 further compares the durability of alloy and dealloy of Sn with Li at a higher current rate of 0.5 C for the tin films made by the traditional electroplating process and by the method of the present invention. It is indicated that both tin films are of the comparable cycle life.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A process of making a negative electrode for a rechargeable lithium battery by plating an active material on a metal substrate comprising the steps of immersing a metal substrate in a plating bath;

plating an anode active material on a metal substrate by swiping a reducing metal on a metal substrate; and rinsing the plated metal substrate and drying it.

2. The process of claim 1, wherein the anode active material has a general formula of $Sn_{1-x-y}M'_xM''_y$ ($0 \leq x \leq 0.50$ and $0 \leq y \leq 0.20$, with a relation of the sum of x and y not to be more than 0.50); M' and M" are independent and selected from the group consisting of Ge, Pb, Sb, Bi, Ti, Mn, Fe, Co, Ni, Cu, Zn, and Ag.

3. The process of claim 1, wherein the metal substrate is a foil made of either Cu or Ni.

4. The process of claim 1, wherein the plating bath is an aqueous acidic solution containing tin, M', and M" salts, the total concentration of the metal ions is from 0.01 M to 0.5 M, and the pH of the solution is from 0.5 to 2.

5. The process of claim 1, wherein the reducing metal is selected from the group consisting of Mg, Al, Mn, Cr and Fe.

6. The process of claim 5, wherein the reducing metal comprises Al.

7. The process of claim 1, wherein the temperature of the plating bath is from 0° C. to 80° C.

8. The process of claim 7, wherein the temperature of the plating bath is from 20° C. to 50° C.

9. The process of claim 8, wherein the temperature of the plating bath is at ambient temperature.

10. The process of claim 1, wherein the pH of the plating bath is adjusted by adding either an inorganic acid or an organic acid.

11. The process of claim 10, wherein the inorganic acid is sulfuric or hydrochloride acid.

12. The process of claim 4, wherein a salts and an acid have the same anion as tin, M', and M" salts.

\* \* \* \* \*